US006389178B1

United States Patent
Agazzi et al.

(10) Patent No.: US 6,389,178 B1
(45) Date of Patent: May 14, 2002

(54) METHOD OF DOWNSAMPLING DOCUMENTS

(75) Inventors: Oscar Ernesto Agazzi, Florham Park; Kenneth Ward Church, Chatham; William Arthur Gale, Maplewood, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/281,879

(22) Filed: Jul. 28, 1994

(51) Int. Cl.[7] ............................................... G06K 9/36
(52) U.S. Cl. ........................................................ 382/276
(58) Field of Search ............................... 382/41, 57, 61, 382/276, 309, 317, 225, 310, 311, 229, 231, 299; 358/403, 404, 448, 452, 462, 464, 466, 467

(56) References Cited

U.S. PATENT DOCUMENTS 3,496,543 A * 2/1970 Greenly .......................... 382/9
5,359,671 A * 10/1994 Rao ............................. 382/15
5,418,864 A * 5/1995 Murdock et al. ........... 382/309

OTHER PUBLICATIONS

Mori et al. "Historical Review of OCR Research and Development" Proceedings of the IEEE vol. 80. No. 7. Jul. 1992.*
Govindan et al. "Character Recognition—A Review" Pattern Recognition vol. 23. No. 7 pp 671–683, 1990.*

Endoh et al. "JBIG ISO JTC1/SC2/WG8 & CCITT SG VI" Jul., 1989 JBIG–N.*
O'Gorman "Image and Document Processing Techniques for the RighPages Electronic Library System" 0–8186–2915–0/92 IEEE.*
S. Mori et al., "Historical Review of OCR Research and Development," *Proceedings of the IEEE*, vol. 80, No. 7, 1029–1057 (Jul., 1992).
V. K. Govindan et al., "Character Recognition—A Review," *Pattern Recognition*, vol. 23, No. 7, 67–683 (1990).
C.F.N. Cowan et al., "Non–Linear System Modelling: Concept and Application," *Proc. 1984 ICASSP*, 4561–4564 (1984).
T. Endoh et al., "Progressive Reduction Standard for Bi–level Images," *JBIG–ISO JTCI/SC2/WG8 CCITT SG VIII* (Jul. 1989).
L. O'Gorman, "Image and Document Processing Techniques for the RightPages Electronic Library System," *Proc. 1992 Int'l Conf. on Pattern Recognition*, vol. II, 260–263 (1992).

* cited by examiner

Primary Examiner—Jose L. Couso
(74) Attorney, Agent, or Firm—Katharyn E. Olson

(57) ABSTRACT

A method downsamples characters in a document by font substitution when the characters in the document are identified with sufficient reliability. Otherwise, the characters are downsampled by decimation. The method also allows downsampling by applying characters to a two-dimensional non-linear filter and decimating.

17 Claims, 7 Drawing Sheets

FIG. 2

Dotplots may have practical ramifications for Information Retrieval (IR) (Salton 1989). There are a number of IR systems that provide rapid access to documents in large electronic libraries. Experience with such systems has shown that users find it difficult to construct queries that cover most of the documents of interest and not to many others. This problem could be alleviated, in part, if document retrieval systems had a more effective way of handling rewrites. In particular, the user is probably only interested in one of the rewrites, e.g. story D. To date, most retrieval systems consider each document one at a time, and consequently, they would usually return either all of the rewrites or none of them. There is generally no easy way to retrieve just one of the rewrites, along with an indication that there are a few more that are nearly the same.

FIG. 3

Dotplots may have practical ramifications for Information Retrieval (IR) (Salton 1989). There are a number of IR systems that provide rapid access to documents in large electronic libraries. Experience with such systems has shown that users find it difficult to construct queries that cover most of the documents of interest and not too many others. This problem could be alleviated in part if document retrieval systems had a more effective way of handling rewrites. In particular, the user is probably only interested in one of the rewrires, e.g. story D. To date, most retrieval systems consider each document one at a time, and consequently, thay would usually return either all of the rewrites or none of them. There is generally no easy way to retrieve just one of the rewrites, along with an indication that there are a few more that are nearly the same.

FIG. 4

Dotplots may bre practical ramification for Information Retrieval (IR) (Salton 1989). There are a number of IR systems that provide rapid access to documents in large electronic libraries. Experience with such systems has shown that users find it difficult to construct queries that cover most of the documents of interest and not to many others. This problem could be alleviated, in part, if document retrieval systems had a more effective way of handling rewrites. In particular, the user is probably only interested in one of the rewrites, e.g. story D. To date, most retrieval systems consider each document one at a time, and consequently, they would usually return either all of the rewrites or none of them. There is generally no easy way to retrieve just one of the rewrites, along with an indication that there are a few more that are nearly the same.

FIG. 5

Dotplots may have practical ramifications for Information Retrieval (IR) (Salton 1989). There are a number of IR systems that provide rapid access to documents in large electronic libraries. Experience with such systems has shown that users find it difficult to construct queries that cover most of the documents of interest and not to many others. This problem could be alleviated, in part, if document retrieval systems had a more effective way of handling rewrites. In particular, the user is probably only interested in one of the rewrites, e.g. story D. To date, most retrieval systems consider each document one at a time, and consequently, they would usually return either all of the rewrites or none of them. There is generally no easy way to retrieve just one of the rewrites, along with an indication that there are a few more that are nearly the same.

FIG. 7
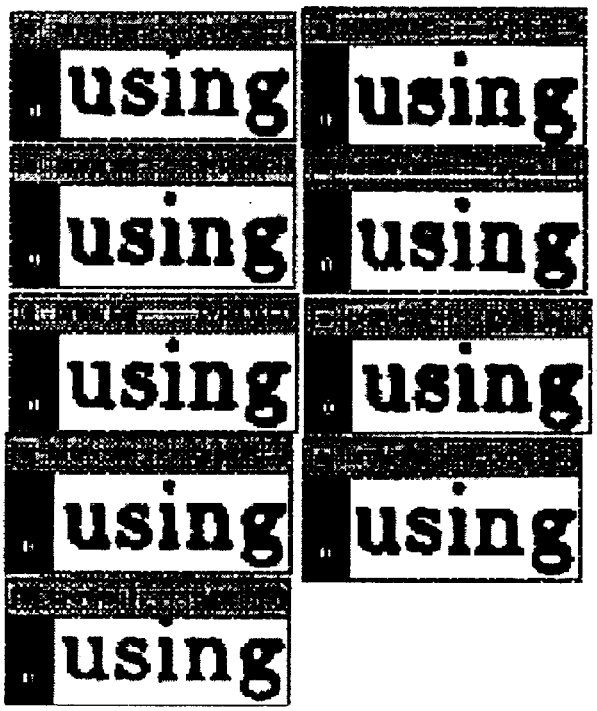
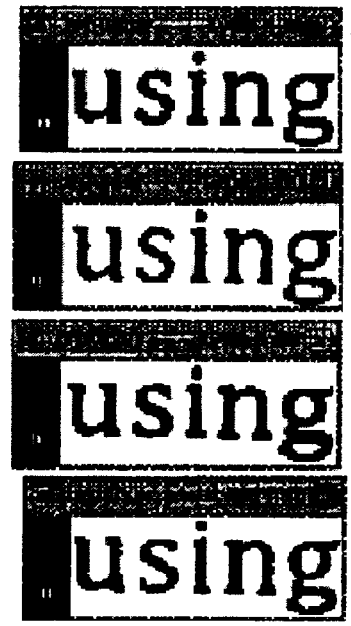
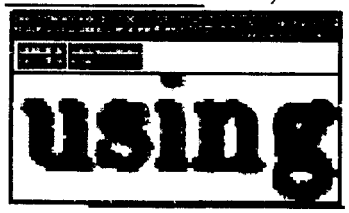
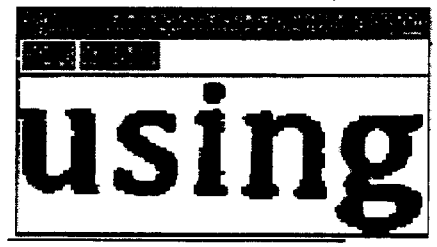
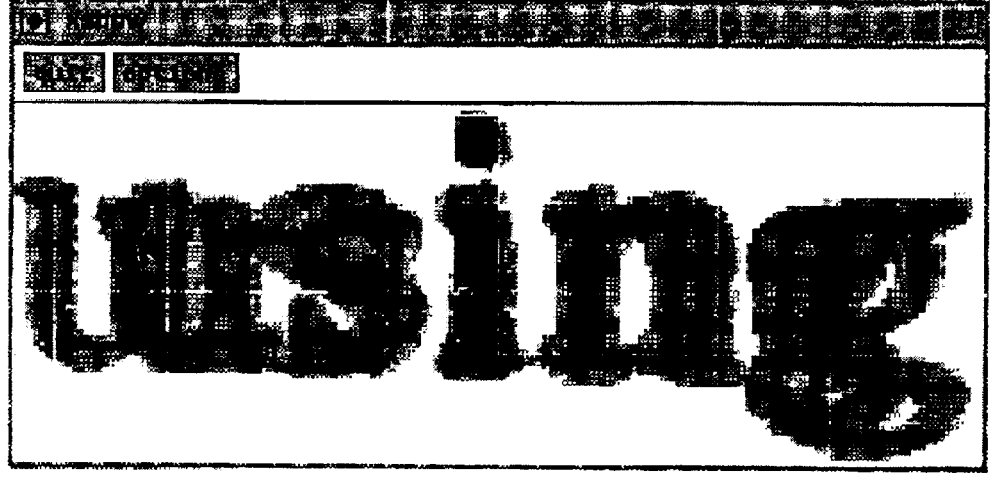

METHOD OF DOWNSAMPLING DOCUMENTS

TECHNICAL FIELD

The invention relates to downsampling documents, and in particular to downsampling using optical character recognition, font substitution and equalization.

BACKGROUND OF THE INVENTION

Input/output devices in modern telecommunications and computer systems are devices by which information (e.g. text, data, video, images, etc.) can be transferred to or from the system or be displayed for further processing or interpretation, including interpretation by people using the system. The information of interest is termed a "document." A document may be made manifest or rendered in variety of forms. For example, a document could be rendered in an analog fashion, e.g. on paper, microfiche, or 35 mm film. Alternatively, the document may be rendered as a digital bit map, e.g. a screen dump, or the document may be rendered in a character representation, e.g. ASCII, Latin 1, unicode or in a markup language such as LATEX, SGML or postscript. It is possible to convert a document in one representation to a document in another representation; however, the conversion may result in a loss of information or in the introduction of noise (e.g. the loss of resolution in documents produced by fax machines).

Importantly, a document often needs to be sampled at different rates in order to be rendered on different output devices. For example, laser printers typically produce tangible paper outputs with a resolution of 300–600 dots per inch (dpi) while the resolution of a fax output is 100–200 dpi, and the resolution of bit map terminals is 75–100 dpi. To output a document where the resolution of the document is higher than the resolution of the output device, it is typically necessary to downsample the higher resolution document so as to output only a portion of the information in the higher resolution document. Standard downsampling techniques include low pass filtering and decimation. However, these techniques do not work well for very low resolution devices.

Another downsampling technique is font substitution. This method is applied only to documents in a text or character representation (i.e. a representation in which the sequence and location of characters is known). A font is a representation of a character set (e.g. an alphabet). A font has a number of attributes: the family (e.g. Times Roman, Helvetica, etc.); the face (e.g. bold, italics, etc.); the size (e.g. 12 point, 18 point); and the resolution of the output device via which the document will be rendered. In font substitution, a character in the higher resolution document is identified, and the character is output to the lower resolution device in a font designed to be "good looking" at the lower resolution. In short, in font substitution one or more of the font attributes are changed before the characters in the document are output to the lower resolution device. The problem with downsampling by font substitution is the need to know, reliably, the position and identity of the characters so that an appropriate substitute can be selected. Such information is available in documents represented in LATEX, SGML or in some optical character recognition (OCR) systems. However, this information is typically not readily available in many types of documents, e.g. faxes. Thus, there is a need for improved methods of downsampling in order to output documents on low resolution devices.

SUMMARY OF THE INVENTION

The aforementioned problems are solved, in accordance with the principles of the invention, by a method of downsampling a component in a document where the component is in a character representation and has an associated reliability measure. The reliability measure indicates the probability that the associated character representation correctly identifies the component. The method downsamples the component by a first method of downsampling if the reliability measure is above a threshold and by a second method of downsampling otherwise.

In preferred embodiments of the invention the first method of downsampling is so-called font substitution, and the second method is so-called decimation. In a further aspect of the invention, decimation is combined with nonlinear filtering in downsampling the component.

BRIEF DESCRIPTION OF THE DRAWINGS

Advantages of the invention will become apparent from the following detailed description taken together with the drawings in which:

FIG. 2 illustrates a document downsampled by decimation.

FIG. 3 illustrates a document downsampled by font substitution.

FIG. 4 illustrates a document downsampled using a first embodiment of the inventive method of downsampling using font substitution where possible and decimation when necessary.

FIG. 5 illustrates a document downsampled using a second embodiment of the inventive method of downsampling with equalization.

FIG. 7 shows examples of a word selected from two different documents and examples of the same word within a single document.

DETAILED DESCRIPTION

I. Introduction

Figure 1:
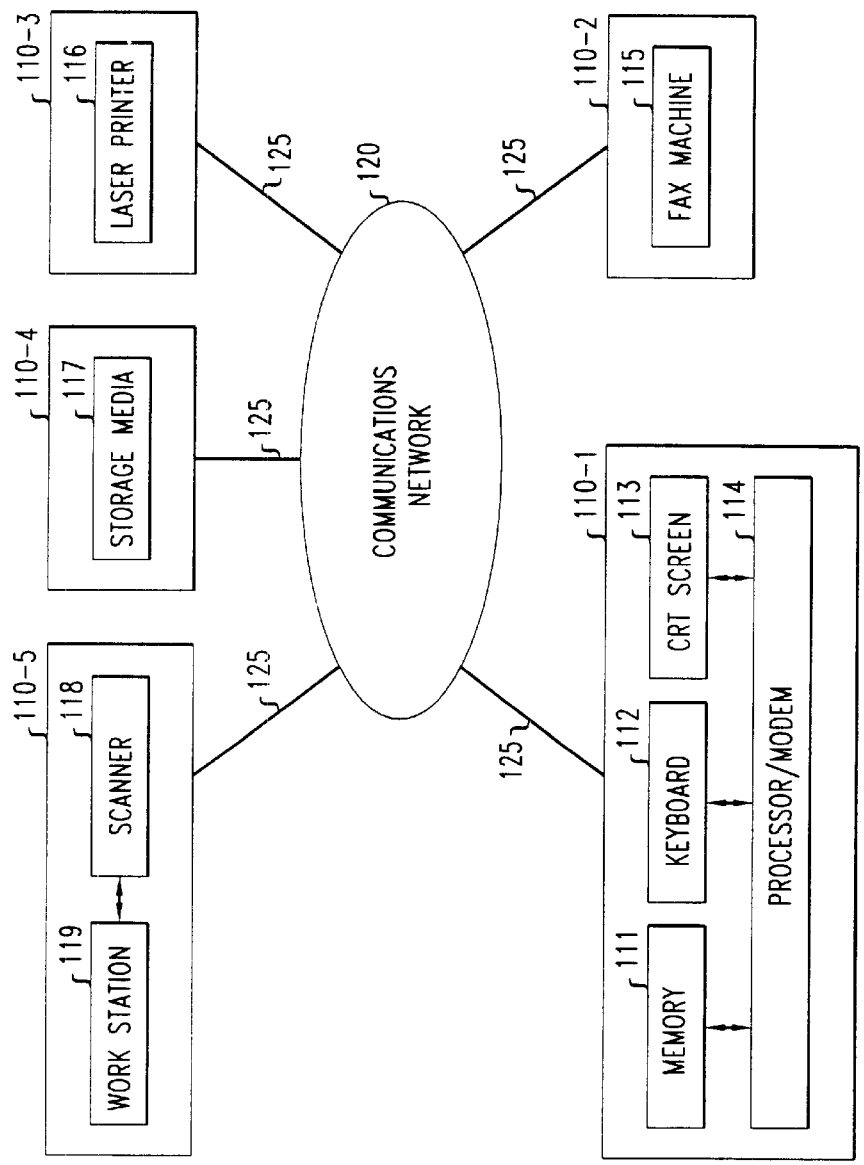
FIG. 1 illustrates a system in which the inventive method may be practiced.

FIG. 1 illustrates a system in which the inventive method for downsampling documents may be practiced. FIG. 1 comprises a number of communications devices 110-i for inputting or outputting information to communications network 120 via links 125. For example, device 110-1 is a basic personal computer comprising memory 111, keyboard 112, CRT screen 113 and processor/modem 114. Device 110-2 is facsimile (fax) machine 115, and device 110-3 is laser printer 116. Those skilled in the art will recognize that other input/output devices may be connected to communications network 120 (e.g. mass storage media 117 in device 110-4 or workstation 119 and optical scanner 120 in device 110-5). The network itself may be the public telephone network, a local area network, etc.

Each device 110-i in network 120 is capable of rendering or making manifest a document. For example, device 110-1 may display the document on CRT screen 113 while printer 111 may output the document on paper. Often, however, each device 110-i will display or print the document at a lower resolution than the resolution of the document from which it is rendered. Thus, devices 110-i must downsample the document. Downsampling is a technique whereby the information in the higher resolution document is prepared for output on the lower resolution device.

A document is any tangible or physical representation of the information (e.g. paper documents or analog and digital photographs thereof including microfiche or scanned images), any hardware/software/firmware description of the information (e.g. postscript or markup languages such as LATEX or SGML—see C. Goldfarb, "The SGML Handbook," Carendon Press, 1990) as well as any intermediate steps in processing the description (e.g. bit mapping) and enhancements. It is convenient to separate documents into two groups. The first group comprises bit map representations of documents where, for each character in the document, each pixel in the representation of that character is either "on" or "off." An example of such a document in this first group is a fax. The second group comprises text representations of documents in which the sequence of characters and the location of characters in the document is specified. Examples of documents in the second group are ASCII files or SGML files.

FIG. 2 illustrates a document that was downsampled by decimation from 400 dpi to 100 dpi. The result looks like the output of a fax machine. It is commonly believed that fax outputs look as bad as they do because it is not possible to do a good job of representing text at 100–200 dpi. In fact, bit map terminals do relatively well at 75–100 dpi-thus demonstrating that the problem with fax outputs is not the resolution but the method of downsampling.

FIG. 3 illustrates a document of the type that has been downsampled by font substitution, i.e. a document in which the position and identity of the character is known. The document in FIG. 3 shows the same text as the document in FIG. 2 but in a 10-point Times Roman font. The result is a document that "looks better" even though it has approximately the same resolution.

FIG. 4 illustrates the results of downsampling a document using a first embodiment of the inventive method. This first embodiment is a hybrid approach in that the downsampling of each character in the document will be by font substitution when possible and by some other technique— illustratively, decimation—when necessary. In particular, the downsampling is by font substitution when the document specifies the identification and location of characters or when this information can be obtained reliably by optical character recognition (OCR) techniques.

OCR is a process for automatically identifying handwritten, printed or displayed characters for the purpose of providing electronic identification of the characters. An example of such an OCR system is ScanWorX available from Xerox Imaging Systems, and those skilled in the art will recognize that a variety of OCR systems and techniques are available. Typically, an OCR system identifies individual characters (e.g. a single letter, number, or punctuation mark). However, instead of performing recognition operations on a character-by-character basis, it is possible for an OCR system to perform recognition operations on a component-by-component basis, where a component is either a character or a small group of connected characters within a word (e.g. letters within a word that are so blurred as to touch one another).

Returning to FIG. 4, if the identification of a character is not reliable, the downsampling is by decimation. This hybrid approach can be applied on a character-by-character or component-by-component basis in a document. Many people would agree that the document of FIG. 4 is more readable than the document of FIG. 2. Although the first aspect of the inventive method typically improves the look of the document, the hybrid approach of the first aspect tends to highlight gaps in the OCR analysis (i.e. where the OCR system cannot reliably identify a character) thus making the document look a bit like a ransom note.

This problem is alleviated by a second aspect of the inventive method in which a channel equalization approach is used to reduce the differences between downsampling by font substitution and downsampling by decimation, thereby making any gaps in the OCR analysis blend into the rest of the text. This process, termed nonlinear document equalization or filter, (described in co-pending application "A Method of Nonlinear Filtering of Degraded Document Images," filed concurrently with the present application, commonly assigned and hereby incorporated by reference) produced the document in FIG. 5. After equalizing, it is difficult to find the gaps in the OCR analysis. Those skilled in the art will recognize that the "ramifi" in "ramifications" and the "In" in "Information" are not as sharp as the rest of the text, but one has to look fairly carefully to find these gaps.

The following sections describe aspects of the inventive method. Specifically, Section II describes a method of downsampling by font substitution/OCR when possible and by decimation when necessary. In particular, the section describes when it is necessary to use decimation. Section III describes in detail the nonlinear document equalization technique introduced above. Section IV summarizes the inventive method and lists other potential applications for the inventive method.

II. A Hybrid Method of Downsampling

Figure 6:
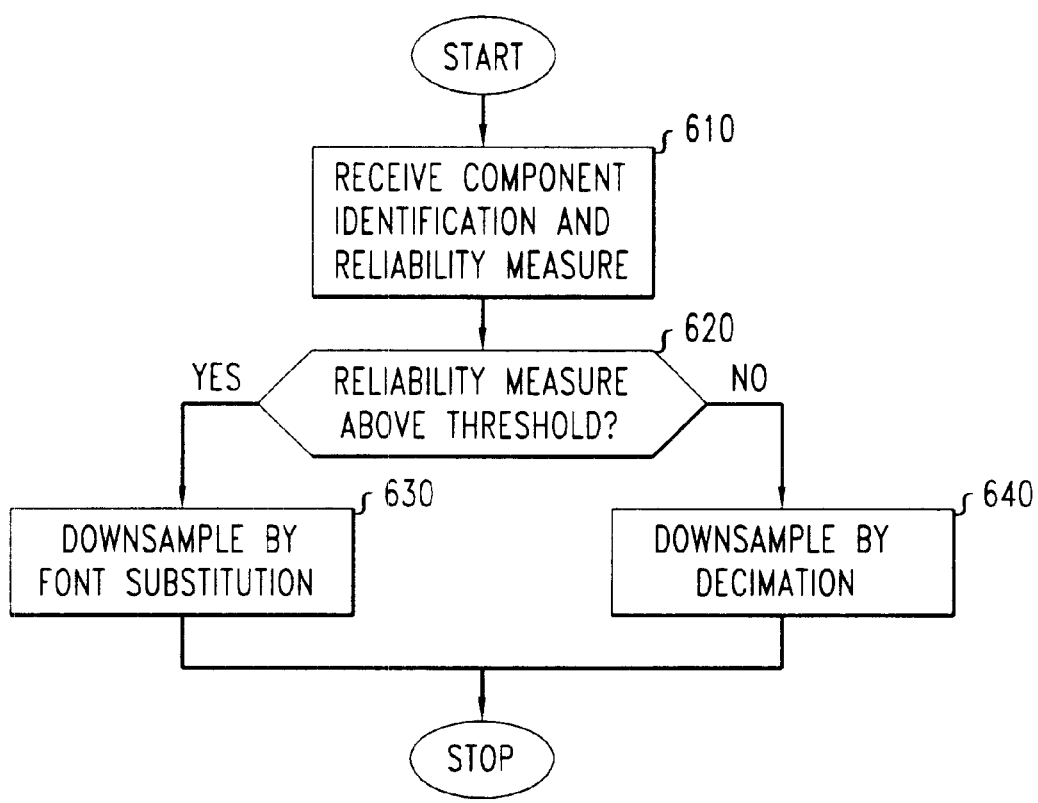
FIG. 6 is a flowchart of a first embodiment of the inventive method.

FIG. 6 illustrates a flowchart of a first embodiment of the inventive method in which a text file representation of a document is downsampled. In the inventive method it proves advantageous to downsample the text representation on a component-by-component basis where a component is either a single character (such as a letter of the alphabet, a number or a punctuation mark) or a small group of connected characters within a word (such as a group of letters within a word that so blurred as to to touch each other). In step 610 the method receives an identification of a component and a measure of the reliability of the identification. In step 620 the reliability measure is compared to a threshold. If the measure of reliability is above a threshold, the component is downsampled by a first method of downsampling (illustratively by font substitution) in step 630; if the measure of reliability is below the threshold, the component is downsampled by a second method of downsampling (illustratively by decimation) in step 640. In this case the threshold is selected so as to trade the better "look" of font substituted documents against the better accuracy in rendering characters by decimation.

The measure of reliability may perhaps be provided by some standard off-the-shelf OCR systems. However, the reliability measure typically is not available. Thus, the following paragraphs describe a further aspect of the inventive method in which a reliability measure is obtained for components identified by OCR systems.

This aspect of the method makes use of the fact that, generally, two instances of the same word in the same document are often very similar to one another-much more so than two instances of a word from different documents. The strong correlation effect within a document (or document specific properties) is not surprising. Chances are that all of the instances of a particular component have been distorted in more or less the same way. For example, each page on which instances of the component appeared was probably about the same generation of photocopy from the original document; similarly if the document was scanned, the gain control on the scanner was probably fairly consistent throughout.

This effect is illustrated in FIG. 7, which shows a number of instances of the word "using" in boxes 710 and 712 selected, respectively, from two different documents. A method to visually determine the similarity between instances of a specific word is to average the bit maps of the instances of the word. Assume initially that each pixel in the bit map of an instance of the specific word is with a "1" (indicating that the pixel is "on") or a "0" (indicating that the pixel is "off"). The corresponding pixels in each instance of the specific word are summed and then divided by the number of instances of the word to determine the average pixel value. For example, the instances of "using" in box 710 were averaged to produce the FIG. in box 711, and instances of "using" in box 712 were averaged to produce the figure in box 713. The averaged instances in boxes 711 and 713 illustrate that within a document, the word "using" was rendered fairly similarly as evidenced by the small amount of fuzziness of the image around the letters in the word. By comparison, all of the instances of "using" across the two documents, i.e. in boxes 711 and 713, were averaged, and the result is shown in the box 715. The result in box 715 is unsatisfactory in that the image is blurry and difficult to recognize.

A more quantitative method to compare the two instances of a word is compute the Hamming distance between bit maps of each instance. The Hamming distance is defined as the number of pixels in which the two bit map images differ. A large Hamming distance will correspond to two images that are very different, i.e. to a bit map average that looks fuzzy. The result in box 715 demonstrates that large Hamming distance measures result in comparing words across two documents. However, if the averaging is confined to instances of the same word within a document, as shown in boxes 711 and 713, then the agreement is better indicating that a Hamming distance measure, or something akin to it, ought to work fairly well, as long as the search for instances of the word is restricted to a single document.

Hence, it proves advantageous to use a Hamming distance approach to build a predicate that compares two boxes and tests whether the pixels in the two boxes correspond to the same word. A box is a set of four variables that define a rectangle on a bit map page (i.e. the coordinates of 2 corners, or the coordinates of one comer and the height and width of the box).

It should be noted that usefulness of a Hamming distance measure of the similarity of two images may also be improved if a slightly non-standard definition of Hamming distance is used. There is often a small sub-pixel error in the registration (e.g. in aligning the images for sampling) of the two images which results in large Hamming distance along the perimeter of the word. It is advantageous to compensate for this by allowing a pixel to match any pixel within a one pixel neighborhood of the target position. In this way, a pixel is counted as an error only if there is no pixel near the position where one would expect to find one. This is a "conservative" Hamming distance measure which avoids the large Hamming distance measures often encountered at the perimeter of a word.

This conservative Hamming distance can be used to cluster all of the components of the document into classes, where each class corresponds to just one component, i.e. one character or group of connected characters in one font. Then a standard off-the-shelf OCR system or software program can be used to identify which classes correspond to which characters. If a particular class is large (i.e. has many elements) and if the OCR results on each member of the class are fairly consistent, then, with reasonable confidence, members of the class can be used for downsampling by font substitution.

The reliability measure may advantageously be based on the degree of similarity in OCR results. For example, if a high percentage (greater than eighty percent for example) of the elements in a class are identified the same way by the OCR system, then that percentage could be used as the reliability measure. If the OCR results are not consistent in that a sufficient percentage of the elements of a class are not identified in the same way, the reliability measure should be low so that decimation is used to downsample instances of the class. Those skilled in the art will recognize that other measures of reliability based on the similarity of or consistency in OCR results can be devised.

Figure 8:
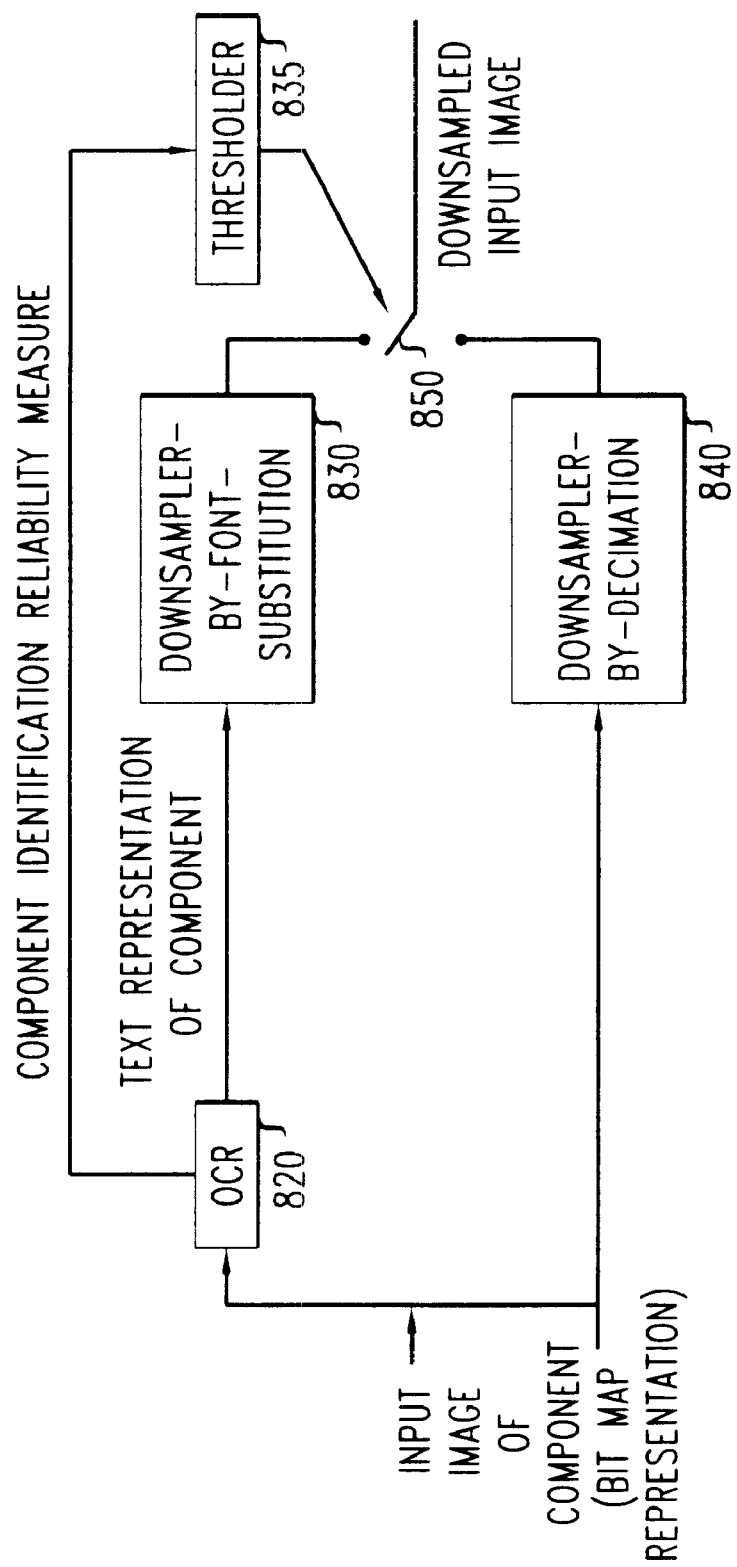
FIG. 8 is a block diagram of a system using a first embodiment of the inventive method in which a document is downsampled using font substitution and decimation.

A conceptual view of a system embodying this aspect of the invention is illustrated in FIG. 8. A bit map representation of the image of a component in a document is input to OCR system 820 and to downsampler-by-decimation 840. Although not shown in FIG. 8, the document comprises a number of components, and the components must be separately input to the system. In accordance with standard document processing techniques, each component in the document can be isolated from the other components by finding an "on" pixel and then finding adjoining "on" pixels. When no more "on" pixels adjoin, i.e. when all the "on" pixels are surrounds by "off" pixels, the adjoining "on" pixels form the component and these pixels can be used to provide the bit map representation that is input to the system.

Returning to FIG. 8, OCR system 820 outputs a text representation of the component and a reliability measure of the identification of the component. The text representation is then input to downsampler-by-font-substitution 830. The reliability measure is input to thresholder 835 which controls switch 850. If the reliability measure is above a threshold, thresholder 835 outputs a signal so that switch 850 will select as the output of the system a downsampled version of the component produced by downsampler using font substitution 830; otherwise, switch 850 selects as the output a downsampled version of the component as generated by downsampler using decimation 840. Note that the system of FIG. 8 allows a document not originally in character representation to be downsampled by font substitution.

III. A Method of Downsampling Using Nonlinear Channel Equalization

This section presents a second embodiment of the invention in which nonlinear document equalization is used to reduce the differences between downsampling by font substitution and downsampling by decimation. In this method if the OCR output is not reliable, instead of downsampling only by decimation, an input image is equalized and downsampled. The equalized and downsampled image is typically "better looking" than an image that is only downsampled.

Figure 9:
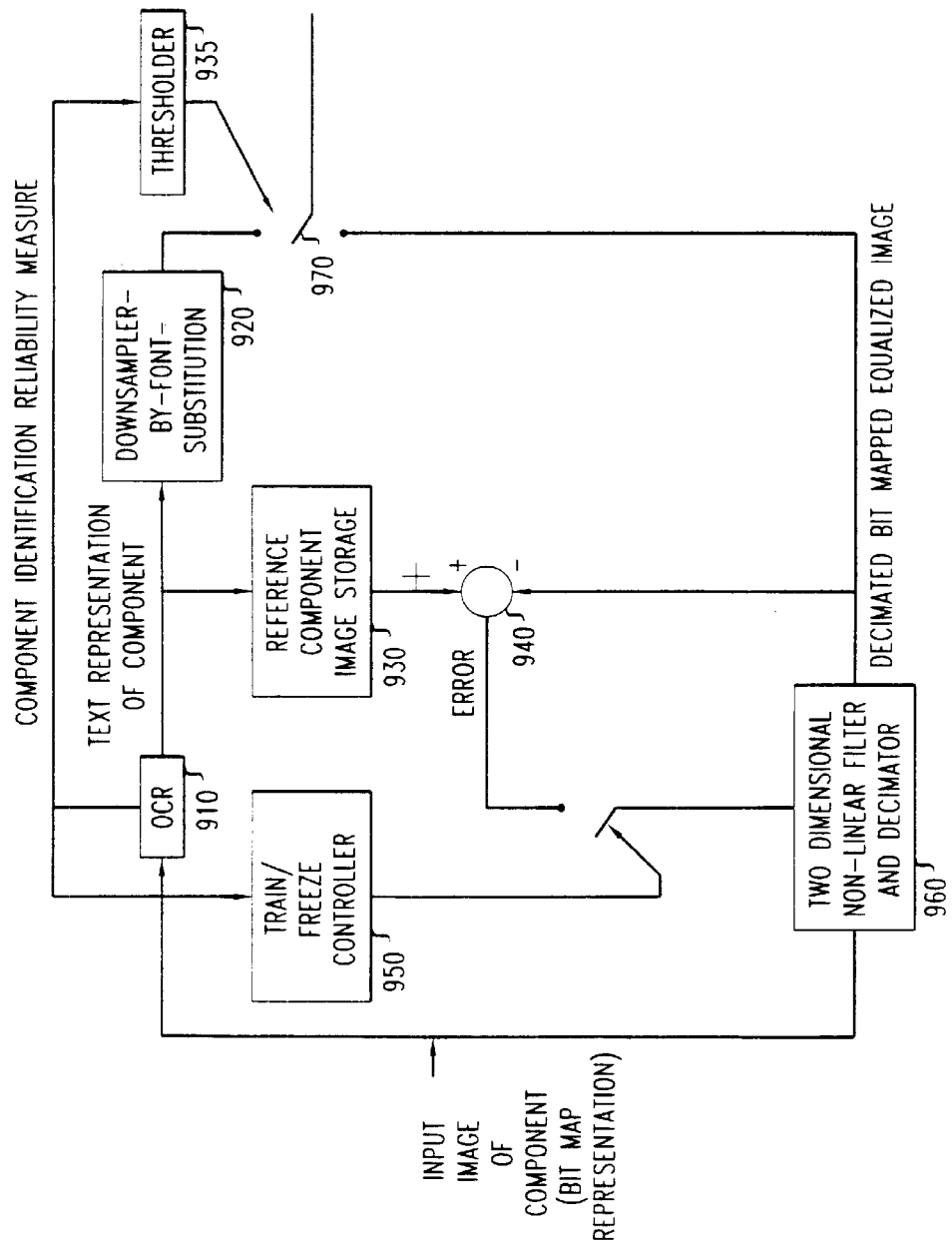
FIG. 9 is a block diagram of a system using a second embodiment of the inventive method in which a document is downsampled using nonlinear adaptive filter.

FIG. 9 is a block diagram of this second embodiment of the inventive method. As with system described in FIG. 8, a bit map representation of the image of a component is input to OCR system 910. OCR system 910 outputs a text representation of the component and a reliability measure of the identification. The text representation is then input to downsampler using font substitution 920. The bit map representation is also input to two-dimensional nonlinear filter and decimator 960 (or more simply, filter 960). As described below, the filtering and decimating operations can be combined.

The use of filter 960 is based on the realization that distortion undergone by documents can in many cases be modeled as a nonlinear filtering operation. For example, a common kind of distortion is blurring followed by thresholding. Such a process occurs when a document is photocopied or scanned. Blur itself is a linear filtering operation that occurs in the optics of the photocopier or scanner. It creates gray levels even if the original image was binary. To recover a binary image, the filtered image is thresholded—a nonlinear operation. The use of different thresholds results in very different images even if the linear filtering part remains the same. These operations can be repeated several times, as when a document is photocopied, perhaps more than once, and then scanned. The resulting nonlinear filtering cannot in general be easily described in terms of a simple (i.e. Gaussian) filter and a few parameters (such as the standard deviation of the Gaussian filter and the threshold), but it can be modeled using more general nonlinear filter structures. The parameters of the filter can be made adaptive to accurately model distortion specific to the document at hand.

Returning to FIG. 9, filter 960 is trained using the input (degraded) images and reference images. The output of filter 960 is called the decimated bit mapped equalized image. The reference images can be obtained using OCR system 910 to provide a text representation of a component for use by reference character storage 930. Reference image storage 930 contains bit mapped representations of reference images (i.e. undegraded component images). Reference image storage 930 may be advantageously implemented as a look up table that takes the text representation supplied by OCR system 910 and outputs a reference image for that text representation. The difference between the equalized image and the reference image (determined at summer 940) is the error, which is used to train the filter and thereby, over time, drive the error to its smallest possible value.

The system of FIG. 9 also advantageously comprises train/freeze controller 950 which regulates the training of filter 960. In particular, train/freeze controller 960 can use the reliability measure generated by OCR system 910 to control switch 980. In particular, if the reliability measure is high, the switch 980 is closed indicating that the reference images can be used to adapt filter 960. Conversely, if the reliability measure is low, the reference images should not be used to train filter 960, and therefore switch 980 should be open to avoid the mistraining of filter 960.

As in the system of FIG. 8 the reliability measure is input to thresholder 935 to control switch 970 in FIG. 9. If the reliability measure is above a threshold, switch 970 will select as the output of the system be a downsampled version of the component produced by downsampler using font substitution 920; otherwise, the output is a downsaampled version of the component as generated by filter 960.

The order in which components are downsampled does not necessarily have to be the same as the order in which the components appear in the document.

For example, it is possible to first downsample by font substitution all those components that can be reliably recognized by OCR system 910 and at the same time to use these same components to train filter 960. Under this condition switch 980 is closed, and switch 970 selects the output of downs ampler by font substitution 920. When all component that could be reliably recognized have been downsampled by font substitution, the remaining components are downsampled by equalization and decimation. At this time, switch 980 is opened (to avoid training filter 960 with incorrectly recognized images), and switch 970 begins to select the output of filter 960. This procedure ensures that enough training data is available to train filter 960.

Filter 960 may be implemented by creating a two-dimensional array of (2M+1)×(2M+1) lookup tables, each one addressed by bits in an (2H+1)×(2H+1)-pixel square support. In this case the address a(k,l,i,j) for lookup table (k,l) (−M≦k,l≦M) at position (i,j) in the image is given by:

$$a(k, l, i, j) = \sum_{r=-H}^{H} \sum_{s=-H}^{H} 2^{(2H+1)(H+r)+H+s} p(i + k + r, j + l + s) \quad (1)$$

where p (i,j)∈0,1 is the pixel at position (i,j) in the image. If the output of lookup table (k,l) at position (i,j) in the image is denoted w(k,l,a(k,l,i,j)), the output of the filter is given by:

$$y(i, j) = \sum_{k=-M}^{M} \sum_{l=-M}^{M} w(k, l, a(k, l, i, j)) \quad (2)$$

The training process minimizes the mean square difference between y(i,j) and the original image, q(i,j). The residual error is given by:

$$\epsilon(i,j) = q(i,j) - y(i,j) \quad (3)$$

The filter is adapted by adding to element w(k,l,a(k,l,i,j)) of lookup table (k,l) a correction α$\epsilon$(i,j) for all k,l, with a a small number that determines the speed of convergence. Note that the filter decimates the input signal by simply computing the output y(i,j) only at selected values of i and j. For example, the output may be computed every $n^{th}$ value, n=1, 2, . . . , of i and j where n is the downsampling factor, i.e. the ratio of the resolution of the image before and after downsampling. Typical values for H,M and α are H=1, M=3 and α=0.0005.

A more detailed description of the structure and training of filter 960 is provided in "A Method of Nonlinear Equalization of Degraded Document Images," filed concurrently with the present application, commonly assigned and incorporated by reference herein.

IV. Conclusion

This disclosure describes a method of downsampling documents using optical character recognition, font substitution and decimation. A method of downsampling using a technique of nonlinear document equalization is also disclosed. The method described herein has been described without reference to specific hardware or software. Instead, the method has been described in such a way that those skilled in the art can readily adapt such hardware or software as may be available or preferable. For example, although one embodiment of a two-dimensional nonlinear adaptive filter has been described for the equalizer of FIG. 9, those skilled in the art will recognize that other alternative filter architectures could be used (e.g. filters based on neural networks) without departing from the scope and spirit of the present invention.

What is claimed is:

1. A method of downsampling a document or a portion thereof comprising a set of one or more components, wherein each component in said set of one or more components is in a text representation and has an associated reliability measure, said reliability measure indicating the probability that the associated text representation correctly identifies said each component, the method comprising the steps of:

downsampling said each component by a first method of downsampling if said reliability measure is above a threshold; and otherwise downsampling said each component by a second method of downsampling if said reliability measure is below said threshold.

2. The method of claim 1 wherein said text representation is generated by an optical character recognition system.

3. The method of claim 1 wherein said reliability measure is generated by the steps of:

clustering into classes according to a distance measure a bit map representation of each component in said document, and for each class, generating a reliability measure based on the degree of similarity between text representations of components within the class.

4. The method of claim 1 wherein said first method of downsampling comprises the step of downsampling said component by font substitution.

5. The method of claim 1 wherein said second method of downsampling comprises the step of downsampling said component by decimation.

6. A method comprising the steps of:

receiving a bit map representation of a component;

generating a text representation of said component;

generating a reliability measure indicating the accuracy of said text representation;

downsampling said component by font substitution if said reliability measure is above a threshold; and downsampling said component by decimation if said reliability measure is below a threshold.

7. The method of claim 6 wherein said text representation is generated by an optical character recognition system.

8. The method of claim 6 wherein said component is contained in a document comprising one or more components and wherein said reliability measure is generated by the steps of:

clustering into classes according to a distance measure the bit map representation of each component in said document, and for each class, generating a reliability measure based on the degree of similarity between text representations of components within the class.

9. A method comprising the steps of:

receiving a bit map representation of a component;

generating a text representation of said component;

generating a reliability measure indicating the accuracy of said text representation;

downsampling said component by font substitution if said reliability measure is above a threshold; and downsampling said component by filtering and decimating if said reliability measure is below a threshold.

10. The method of claim 9 wherein said component is contained in a document comprising one or more components and wherein said reliability measure is generated by a method comprising the steps of:

clustering into classes according to a distance measure the bit map representation of each component in said document, and for each class:

generating a reliability measure based on the degree of similarity between text representations of each component within the class.

11. The method of claim 9 further wherein the step of downsampling said component by filtering and decimating if said reliability measure is below a threshold further comprises the steps of:

applying said bit map representation of said component to a two-dimensional nonlinear filter to generate an output $y(i,j)$; and determining the output of said two-dimensional nonlinear filter at selected values of i and j.

12. A method of downsampling a document or a portion thereof comprising a set of one or more components, wherein each component in said set of one or more components is in a text representation and has an associated reliability measure, said reliability measure indicating the probability that the associated text representation correctly identifies said each component, the method comprising the steps of:

downsampling said each component in said document by font substitution if the reliability associated with said each component measure is above a threshold; and downsampling said each component by decimation if said reliability measure associated with said each component is below said threshold.

13. The method of claim 12 wherein said text representation is generated by an optical character recognition system.

14. The method of claim 12 wherein said reliability measure is generated by the steps of:

clustering into classes according to a distance measure a bit map representation of each component in said document, and for each class, generating a reliability measure based on the degree of similarity between text representations of components within the class.

15. An apparatus for downsampling a component in a document, wherein said component is in a text representation and wherein said component has an associated reliability measure, said reliability measure indicating the probability that the associated text representation correctly identifies said component, the method comprising the steps of:

means for downsampling said component in said document by font substitution if the reliability associated with said component measure is above a threshold; and means for downsampling said component by decimation if said reliability measure associated with said component is below said threshold.

16. The apparatus of claim 15 further comprising an optical text recognition system for generating said character representation.

17. The apparatus of claim 15 including means for generating said reliability measure comprising:

means for clustering into classes according to a distance measure a bit map representation of each component in said document, and for each class, means for generating a reliability measure based on the degree of similarity between text representations of components within the class.

* * * * *